UNITED STATES PATENT OFFICE.

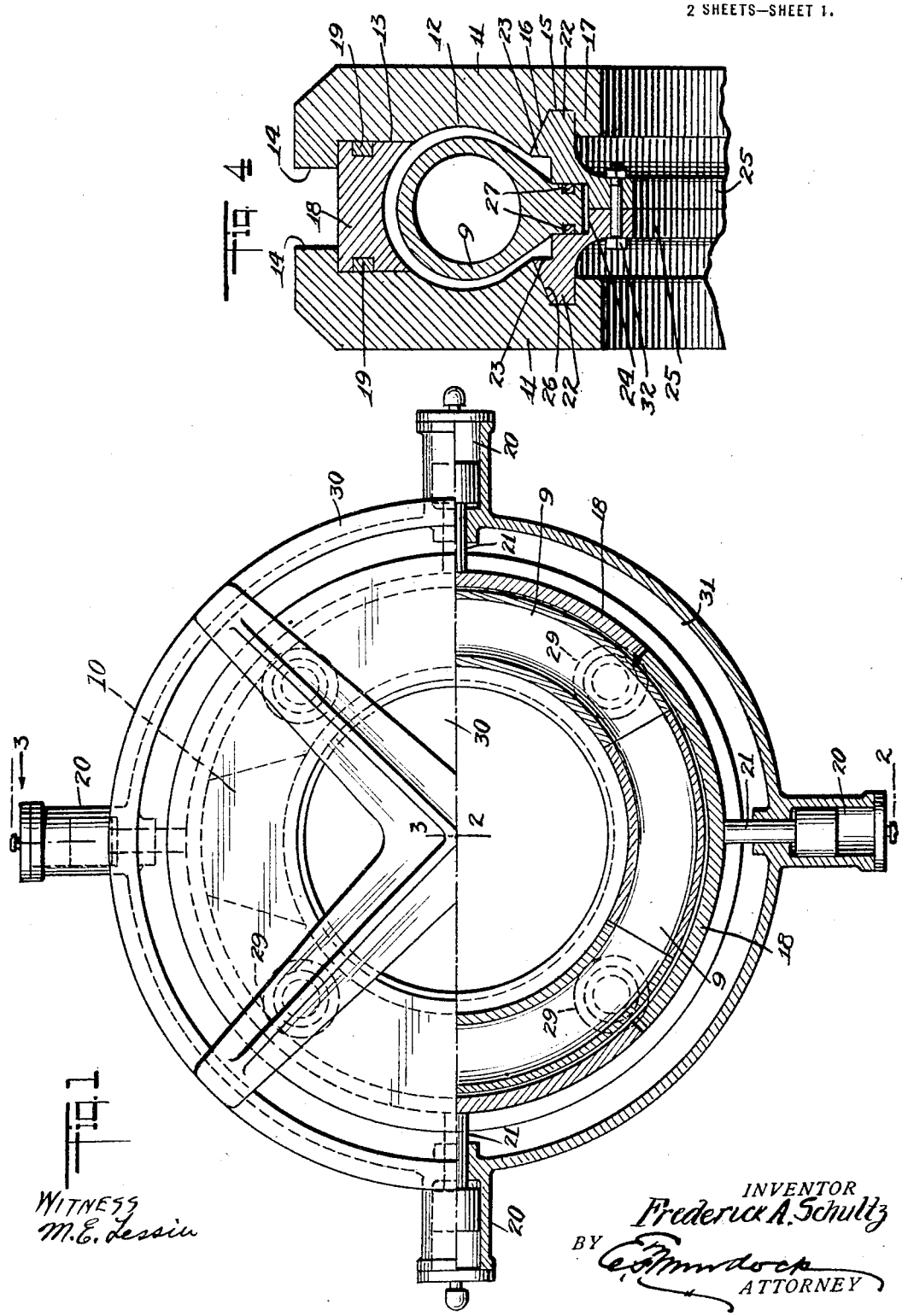

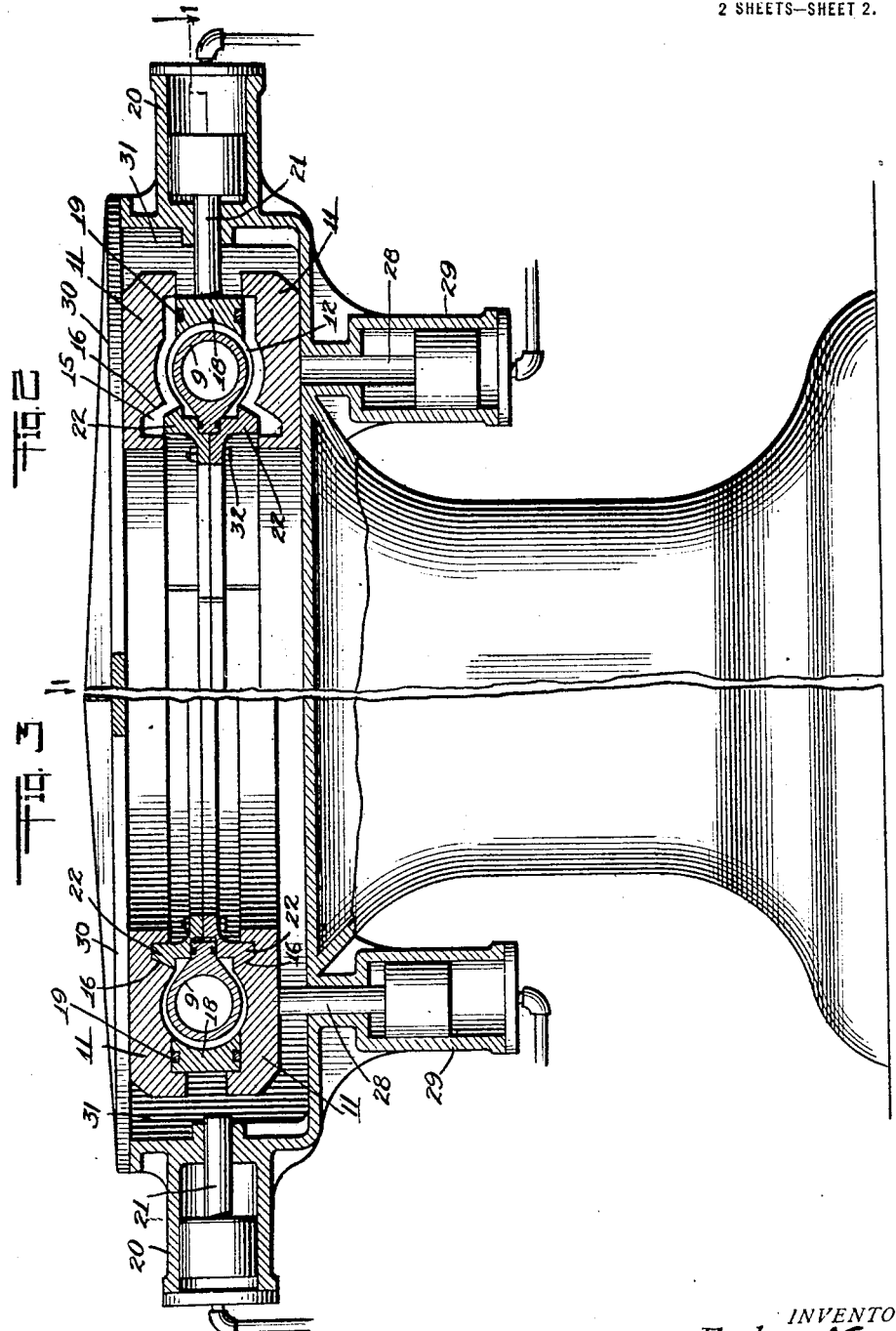

FREDERICK A. SCHULTZ, OF HASBROUCK HEIGHTS, NEW JERSEY.

PNEUMATIC-TIRE-MAKING MACHINE.

1,411,588. Specification of Letters Patent. Patented Apr. 4, 1922.

Application filed October 27, 1920. Serial No. 419,820.

*To all whom it may concern:*

Be it known that I, FREDERICK A. SCHULTZ, a citizen of the United States, and a resident of Hasbrouck Heights, in the county of Bergen and State of New Jersey, have invented certain new and useful Improvements in a Pneumatic-Tire-Making Machine, of which the following is a full, clear, and exact description.

Among the principal objects which the present invention has in view are: to standardize the inner dimension and wall of tires of the character mentioned; to stretch cord tires over a rigid core; to secure evenness of tension on the fabric employed in the manufacture of tires; and to secure for cord tires the regularity in size and firmness of structure obtained in fabric tires.

Drawings.

Figure 1 is a top plan view partly in section of a machine of the character mentioned, constructed and arranged in accordance with the present invention, the section being taken as on the line 1—1 in Fig. 2.

Figure 2 is a vertical section of the machine, the section being taken as on the line 2—2 in Fig. 1.

Figure 3 is a vertical section taken as on the line 3—3 in Fig. 1.

Figure 4 is a detail view on enlarged scale showing a cross section of the mold for shaping the tire.

Description.

Heretofore, the so-called fabric tires or tires constructed from fabric cut on the bias, the woof and web threads whereof are of equal dimension, have been constructed satisfactorily on solid cores about which the fabric has been molded or drawn diagonally with their ends knitted or rolled to form the beads with which the tire is furnished. When so molded mounted on the core, mold members have been pressed upon the tire to compress the same between the inner walls of the mold members and of the core. When the so-called cord fabric was employed in the manufacture of tires, it was found difficult and sometimes impossible to stretch or pull the fabric about the mold with sufficient force to secure even tension and smooth lying layers of said fabric. This difficulty was overcome by discontinuing the use of a solid core and by employing instead an annular pneumatic tube or bag, by means of which internal pressure was applied to the tire which expanded it outward to the mold members and incidently stretched the cord fabric members from bead to bead. Many difficulties have arisen as the result of this method of manufacture, prominent among which is the fact that the tube or bag which is contained within the tire during the vulcanization thereof, is often vulcanized with the inner lining of the tire, requiring the destruction of the tube or bag, to remove the same. Further the necessity of holding the bead structure during the expansion of the tube or bag, and the adaptability of the bag to accommodate uneven strains in the fabric has been met by the manufacturer only by providing sufficient slack in the fabric to insure the even disposition of all parts of the tire against the surrounding mold. As a concomitant of this practice, tires have been produced having uneven stresses in the body structure thereof.

The above mentioned difficulties have been eliminated when employing the machine herein described, wherein a rigid hollow core is used. As shown best in Fig. 1 of the drawings, the core 9 is made up of separable sections, the section 10 being web-shaped to allow for the removal of the remaining sections of the core after first removing the key section 10. The cord strips are laid on this core in the same manner as formerly employed with woven fabric on rigid cores. The ends of the strips are knitted or rolled down at the beads with the usual pressure obtained by manual handling. When the core 9 has been covered and the tread or outer coating for the tire has been piled, the surrounding mold is in position over the tire.

The mold embodied in the present invention consists of two annular solid cheek plates 11. The plates 11 have each a curved annular median section 12, and an annular recess 13, the wall whereof is parallel with the plane of the core 9 when in service, and is formed in part by the edge flange 14. At the opposite side of the section 12 each plate 11 has an annular groove 15, the outer wall 16 whereof, is inclined. The groove is bounded on the inner side by the annular flange 17.

Corresponding with the recess 13 is a tread mold 18. The mold 18 is formed in sections preferably four in number as shown best in Fig. 1 of the drawings. The sections 18 have each laterally opening grooves in which rest solid continuous locking rings 19. The rings 19 fall into the grooves provided therefor in the sections of the tread mold 18 when the said sections are pressed together sufficient for their ends to firmly butt. When the segments 18 are butted in the manner indicated, the outer walls thereof pass within the circle of the flanges 14 of the plates 11, which may then be laterally moved upon the tire core 9.

In practice the compression of the segments 18 are primarily adjusted, holding on the tire structure surrounding the core 9. This is accomplished by means of hydraulic rams 20, the plungers 21 whereof, rest upon the said segments so that when power is applied to the said rams, the segments are moved inward pressing the tread of the tire upon the core 9. When this is accomplished the bead plates 22 are adjusted so that the bead-shaping shoulders 23 thereof fit over the kneaded portion of the tire forming said beads. Initially, the side walls of the tire are short by so much as equals the stretch which is to be imparted to the cord strips. Therefore the plates 22 are constructed in segments and in the initial position of said plate segments the outer surfaces 24 of the flanges 25 rest against the inner butt of the core, as shown best in Fig. 2 of the drawings, while the ends of said flanges and of plate segments are spaced apart.

The plates 22 are formed in segments which when drawn together form a perfect circle. The plates have, at the outer perimeter, inclined surfaces 26 which correspond to the surfaces 16 of the grooves 15.

Prior to adjusting the plates 22, the segments of the core 9 are held in service relation by aligning rings 27. The rings 27 are continuous and drop into grooves provided to receive them in the segments forming the core 9 when the said segments are pressed closely together by reason of the pressure which is applied by the rams 20 upon the segments of the mold 18.

After the plates 22 have been adjusted, the plates 11 are disposed thereover, the grooves 15 of the plates 11 fitting over the said plates 22. The inclined surfaces 16 of the plates 11 extending partly over the inclined surfaces 26 of the plates 22. The plates 11 are solid continuous rings.

As shown best in Figures 2 and 3, the plates 11 are placed between the plungers 28 of rams 29 and a cap plate 30 for covering the vulcanizing chamber 31. In Fig. 2, the plates 11 are shown in their open position and as primarily adjusted to the mold 18 and plates 22. In Fig. 3 the plates 11 are closed on the mold 18, plates 22 and the tire on the core 9. The parts are retained in the latter position while heat is admitted to the chamber 31 of sufficient degree and time to vulcanize the material forming the tire.

As the plates 11 close on the plates 22 the inclined walls 16 of the grooves 15 engage the inclined surfaces 26 of the plates 22 at a point near the outer edges of the plates 22. The subsequent movement of the plates 11 upon the plates 22 forces the segments of the plates 22 inward toward the center of the core, the segments of the plate being shaped to permit of this action. In the contraction of the said plates, the grip on the beads of the tire being maintained, the side walls of the tire are stretched down over the side walls of the core 9 before the sections 12 of the plates 11 fully engage the material of the tire. In the final seating of the plates 11, the plates 22 register with the groove 15 having pulled the fabric of which the tire is constructed, to its exact position and with uniform stretch throughout the tire.

If it is desired, pressure may be taken from the mold segments 18 by withdrawing the plungers 21 of the rams 20 as shown in Fig. 3 of the drawings. In this position the flanges 14 passing behind and engaging the mold segments 18 prevent their being expanded outwardly during the course of manufacture. If it is desired at any point in the treatment of the tire, the plates 11 may be opened and the tire with the core 9 and plate 22 and mold segments 18 may be removed from the vulcanizing chamber 31 and handled at any other convenient place or point without removing the segments 18 and the plates 22. The plates 22 will be held in position by the bolts while the rings 19 prevent the expansion of the segments 18.

From the foregoing it will be seen that tires constructed by means of the herein described machine will be stretched so that an even tension is provided for the side walls of the tire and a uniform tendency is imparted to the structure thereof. Also particularly it will be seen that the tires have standardized dimensions externally and internally.

*Claims.*

1. A machine as characterized comprising a mold having a rigid core; rigid annular tire side wall shaping members; a plurality of segmental tread shaping members contractible by pressure applied externally upon the tread of the tire to compress the same upon said core; a plurality of segmental bead gripping members contractible to draw the bead of the tire centripetally to desired dimension; and means for contracting said bead gripping members, said means embodying co-operating cam surfaces on said gripping members and said side wall shaping members, said surfaces operating to displace the bead gripping sections from their initial position toward the center of said side wall shaping members.

2. A machine as characterized comprising a mold having a rigid core; rigid annular tire side wall shaping members; a plurality of segmental tread shaping members contractible by pressure applied externally upon the tread of the tire to compress the same upon said core; a plurality of segmental bead gripping members contractible to draw the bead of the tire centripetally to desired dimension; means for contracting said bead gripping members, said means embodying co-operating cam surfaces on said gripping members and said side wall shaping members, said surfaces operating to displace the bead gripping sections from their initial position toward the center of said side wall shaping members; and means for applying pressure to move said tread shaping members and said side wall shaping members toward said core.

3. A machine as characterized comprising a mold having a rigid core; rigid annular tire side wall shaping members; a plurality of segmental tread shaping members contractible by pressure applied externally upon the tread of the tire to compress the same upon said core; a plurality of segmental bead gripping members contractible to draw the bead of the tire centripetally to desired dimension; means for contracting said bead gripping members, said means embodying co-operating cam surfaces on said gripping members and said side wall shaping members, said surfaces operating to displace the bead gripping sections from their initial position toward the center of said side wall shaping members; means for applying pressure to move said tread shaping members and said side wall shaping members toward said core; and means for locking said tread shaping members in annular service relation, said means embodying holding members formed on said side wall shaping members to engage said tread shaping members after the same have been contracted.

4. A machine as characterized comprising a mold having a rigid core; rigid annular tire side wall shaping members; a plurality of segmental tread shaping members contractible by pressure applied externally upon the tread of the tire to compress the same upon said core; a plurality of segmental bead gripping members contractible to draw the bead of the tire centripetally to desired dimension; means for contracting said bead gripping members, said means embodying co-operating cam surfaces on said gripping members and said side wall shaping members, said surfaces operating to displace the bead gripping sections from their initial position toward the center of said side wall shaping members; means for applying pressure to move said tread shaping members and said side wall shaping members toward said core; and means for locking said tread shaping members in annular service relation, said means embodying holding members formed on said side wall shaping members to engage said tread shaping members after the same have been contracted, said means embodying continuous rings for engaging said tread shaping members in their contracted position for holding said tread shaping members independently of other agencies.

5. A machine as characterized comprising a mold having a rigid core; rigid annular tire side wall shaping members; a plurality of segmental tread shaping members contractible by pressure applied externally upon the tread of the tire to compress the same upon said core; a plurality of segmental bead gripping members contractible to draw the bead of the tire centripetally to desired dimension; means for contracting said bead gripping members, said means embodying co-operating cam surfaces on said gripping members and said side wall shaping members, said surfaces operating to displace the bead gripping sections from their initial position toward the center of said side wall shaping members; and means for applying pressure to move said tread shaping members and said side wall shaping members toward said core, said means embodying a plurality of prime movers for exerting pressure upon said tread forming and side wall forming members.

6. A machine as characterized comprising a mold having a rigid core; rigid annular tire side wall shaping members; a plurality of segmental tread shaping members contractible by pressure applied externally upon the tread of the tire to compress the same upon said core; a plurality of segmental bead gripping members contractible to draw the bead of the tire centripetally to desired dimension; means for contracting said bead gripping members, said means embodying co-operating cam surfaces on said gripping members, and said side wall shaping members, said surfaces operating to displace the bead gripping sections from their initial position toward the center of said side wall shaping members; and means for applying pressure to move said tread shaping members and said side wall shaping members toward said core, said means embodying a plurality of prime movers for exerting pressure upon said tread forming and side wall forming members, respectively and successively.

FREDERICK A. SCHULTZ.